(12) United States Patent
Wong et al.

(10) Patent No.: US 9,338,801 B2
(45) Date of Patent: May 10, 2016

(54) APPARATUS AND METHOD FOR PERFORMING AN UPLINK RANDOM ACCESS PROCEDURE

(75) Inventors: Shin Horng Wong, Chippenham (GB); Matthew Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 130 days.

(21) Appl. No.: 14/238,022

(22) PCT Filed: Jul. 24, 2012

(86) PCT No.: PCT/EP2012/003123
§ 371 (c)(1),
(2), (4) Date: May 14, 2014

(87) PCT Pub. No.: WO2013/020652
PCT Pub. Date: Feb. 14, 2013

(65) Prior Publication Data
US 2014/0321437 A1  Oct. 30, 2014

(30) Foreign Application Priority Data

Aug. 10, 2011 (EP) .................................... 11306032

(51) Int. Cl.
*H04W 74/08* (2009.01)
*H04W 72/04* (2009.01)
*H04W 74/00* (2009.01)
(52) U.S. Cl.
CPC ........ *H04W 74/085* (2013.01); *H04W 72/0413* (2013.01); *H04W 74/0833* (2013.01); *H04W 74/006* (2013.01)

(58) Field of Classification Search
CPC .................................................. H04W 72/0413
See application file for complete search history.

(56) References Cited

U.S. PATENT DOCUMENTS

| 2008/0225785 | A1* | 9/2008 | Wang et al. | 370/329 |
| 2010/0080194 | A1* | 4/2010 | Kawasaki et al. | 370/332 |
| 2014/0079011 | A1* | 3/2014 | Wiberg et al. | 370/329 |

OTHER PUBLICATIONS

"$3^{rd}$ Generation Partnership Project; Technical Specification Group Radio Access Network; Physical layer procedures (FDD) (Release 10)," 3GPP TS 25.214 V10.2.0, XP050476515, pp. 1-100, ((Mar. 2001).

(Continued)

*Primary Examiner* — Paul H Masur
(74) *Attorney, Agent, or Firm* — Fay Sharpe LLP (57) ABSTRACT

Performing a random access procedure from a mobile terminal to communicate with a wireless communication network includes providing a first and second group of available random access radio resources. The first and second group comprises a plurality of random access radio resources assigned to the mobile terminal for sending a random access preamble to the wireless communication network. A sliding resource window is provided to the mobile terminal, the resource window comprising a plurality of consecutive available random access radio resources from at least one of the two groups. The mobile terminal may randomly select, from the resource window, one of the available random access radio resources assigned to the mobile terminal for sending the random access preamble, and a start of the sliding resource window depends on an available random access radio resource, which is currently valid for uplink random access to the cell of the wireless communication network.

15 Claims, 8 Drawing Sheets

(56) References Cited

OTHER PUBLICATIONS

"3$^{rd}$ Generation Partnership Project; Technical Specification Group Radio Access Network; Physical channels and mapping of transport channels onto physical channels (FDD) (Release 10)," 3GP TS 25.211 V10.0.0, XP 050442090, pp. 1-58, (Sep. 2010).

Qualcomm, "LS on further enhancements for CELL_FCH," 3$^{rd}$ Generation Partnership Project (3GPP), 3GPP TSG RAN WG1 Meeting #65, R1-111336, XP05012512, 1 page, Span, Barcelona, May 9-13, 2011.

Ericsson et al., "Overview of CELL_FACH enhancements," 3$^{rd}$ Generation Partnership Project (3GPP), 3GPP TSG RAN WG2 #73bis, R2-112323, XP050494633, pp. 1-5, Shanghai, P.R. of China, Apr. 11-15, 2011.

Ericsson et al., "On Further Enhancements to CELL_FACH," 3$^{rd}$ Generation Partnership Project (3GPP), 3GPP TSG RAN WG2 #65, R1-111764, XP050491351, 6 pages, Barcelona, Spain, May 9-13, 2011.

Ericsson et al., "Further Uplink Enhancements to CELL_FACH," 3$^{rd}$ Generation Partnership Project (3GPP), 3GPP TSG RAN WG1 #66, R1-112617, XP055012523, 6 pages, Athens, Greece, Aug. 22-26, 2011.

Alcatel-Lucent et al., "Reduction in initial PRACH access timing," 3$^{rd}$ Generation Partnership Project (3GPP), 3GPP TSG RAN WG1 #73bisMeeting #66bis, R1-113307, XP055012502, 6 pages, Zhuhai, China, Oct. 10-14, 2011.

International Search Report for PCT/EP2012/003123 dated Sep. 12, 2012.

European Search Report for EP 11306032.1 dated Nov. 18, 2011.

* cited by examiner

Prior Art

Fig. 8a

Prior Art

Fig. 8b

Prior Art

APPARATUS AND METHOD FOR PERFORMING AN UPLINK RANDOM ACCESS PROCEDURE

This application is a U.S. national stage entry of Application No. PCT/EP2012/003123, filed Jul. 24, 2012, which claims priority from European Application No. 11306032.1, filed Aug. 10, 2011.

Embodiments of the present invention generally relate to wireless communications and, more specifically, to methods and apparatuses for performing uplink random access procedures from a mobile terminal to a wireless communication network.

BACKGROUND

Wireless communication networks are steadily growing with an increasing number of systems for mobile communication being deployed. Today, wireless mobile communication networks based on various underlying Radio Access Technologies (RATs) are available. Second generation (2G) mobile communication systems, such as e.g. GSM/EDGE (Global System for Mobile Communications/Enhanced Data Rates for GSM Evolution), are based on a combined TDMA/FDMA (Time Division Multiple Access/Frequency Division Multiple Access) scheme. Third generation (3G) mobile communication systems, such as UMTS (Universal Mobile Telecommunications System) or CDMA2000 (IS-2000), are based on code division multiple access (CDMA) technology. Newer mobile communication technologies, such as e.g. WiMAX (Worldwide Interoperability for Microwave Access) or 3GPP (3rd Generation Partnership Project) Long Term Evolution (LTE), are based on orthogonal frequency division multiplexing (OFDM) technologies. LTE, e. g., uses OFDMA in the downlink and single carrier frequency division multiple access (SC-FDMA) in the uplink.

In various cellular communication systems, after power on, a mobile terminal a mobile terminal stays in a so-called Idle Mode until a request to establish an RRC (Radio Resource Control) connection is transmitted to the wireless network. In Idle Mode the Radio Network Controller (RNC) has no information on an individual mobile terminal, and can only address, for example, all mobile terminals in a radio cell or all mobile terminals monitoring a paging occasion. A mobile terminal may transit from Idle Mode to Connected Mode when an RRC connection is established, wherein the RRC connection may be defined as a point-to-point bidirectional connection between RRC peer entities in the mobile terminal and the wireless network, as, for example, the UMTS Terrestrial Radio Access Network (UTRAN) or the evolved UMTS Terrestrial Radio Access Network (eUTRAN) which is the air interface of LTE. Although embodiments of the present invention are in principle also applicable to other wireless communication systems, the following description will, only for exemplary reasons, focus on the wireless communication systems UMTS and LTE.

In the UMTS system, a Wideband Code Division Multiple Access (WCDMA) system, a mobile terminal, also referred to as User Equipment (UE) in the 3GPP standards, that has a RRC connection with a base station (NodeB), can transmit and receive user traffic in various RRC states, e.g. in the Cell_DCH (Dedicated Channel) and Cell_FACH (Forward Access Channel) states.

While the Cell_DCH state is characterized by an allocation of a circuit-switched Dedicated Physical Channel (DPCH) to the mobile terminal in uplink and downlink direction, respectively, wherein uplink refers to the communication direction from the mobile station to the base station, and downlink refers to the communication direction from the base station to the mobile station, no dedicated physical channel is allocated to the mobile station in Cell_FACH state, in which the mobile station continuously monitors a packet-switched Forward Access Channel (FACH) in the downlink. Packet switching is a digital networking communications method that groups all transmitted data—regardless of content, type, or structure—into suitably sized blocks, called packets. Packet switching features delivery of variable-bit-rate data streams (sequences of packets) over a shared network. When traversing network adapters, switches, routers and other network nodes, packets are buffered and queued, resulting in variable delay and throughput depending on the traffic load in the network. In Cell_FACH state the mobile station is also assigned a default common or shared transport channel in the uplink, as e.g. a common E-DCH (Enhanced Dedicated Channel) or a RACH (Random Access Channel) which it can use anytime according to the access procedure for that transport channel.

The RACH typically is a contention-based transport channel for initial uplink transmission, i.e., from the mobile terminal to the base station. The RACH function may be different depending on the technology of the system. This random access channel may be used for several purposes, as e.g. to access the network, to request resources, to carry control information, to adjust a timing-offset for the uplink, to adjust an uplink transmit power, etc. It may even be used to transmit small amounts of packet data. Contention resolution is the key feature of the RACH. Many mobile stations may attempt to access the same base station simultaneously, leading to collisions.

In the UMTS system, for example, a mobile terminal can make a random access to the uplink resources of a base station. This allows a base station to initiate a RRC connection to the network from an Idle Mode and send uplink transmissions in Cell_FACH state. The random access procedure comprises the mobile terminal decoding Broadcast Channel (BCH) information carried by the corresponding P-CCPCH (Primary Common Control Physical Channel) and finding out the RACH slots available as well as the scrambling code(s). The mobile terminal may then randomly select one of the available RACH resources, i.e. RACH slots, to be used for sending its preamble to the network. For this purpose the mobile terminal may set an initial power level to be used and transmit its preamble to the network. The mobile terminal may select a preamble signature randomly from a set of signatures. The RACH preamble in the UMTS system is of length 4096 chips and comprises of 256 repetitions of a signature of length 16 chips. There are a maximum of 16 available preamble signatures. All 16 preamble signature codes are available in every radio cell. After having sent the preamble, the mobile terminal waits for an Acquisition Indicator Channel (AICH) message from the base station, indicating to the mobile terminal whether it is allowed to proceed to a message part of the RACH procedure. If the AICH is negative, the mobile terminal will back off a random time, otherwise it will proceed to the message part. The mobile terminal transmits its uplink data traffic in the message part, which can be carried by the RACH or the common E-DCH. A 10 ms RACH message part radio frame is split into 15 slots, each of a length of 2560 chips. Each slot comprises two parts, a data part to which the RACH transport channel is mapped and a control part that carries Layer-1 control information. The data and control parts are transmitted in parallel. A 10 ms message part comprises one message part radio frame, while a 20 ms message part comprises two consecutive 10 ms message part radio frames.

Figure 7:
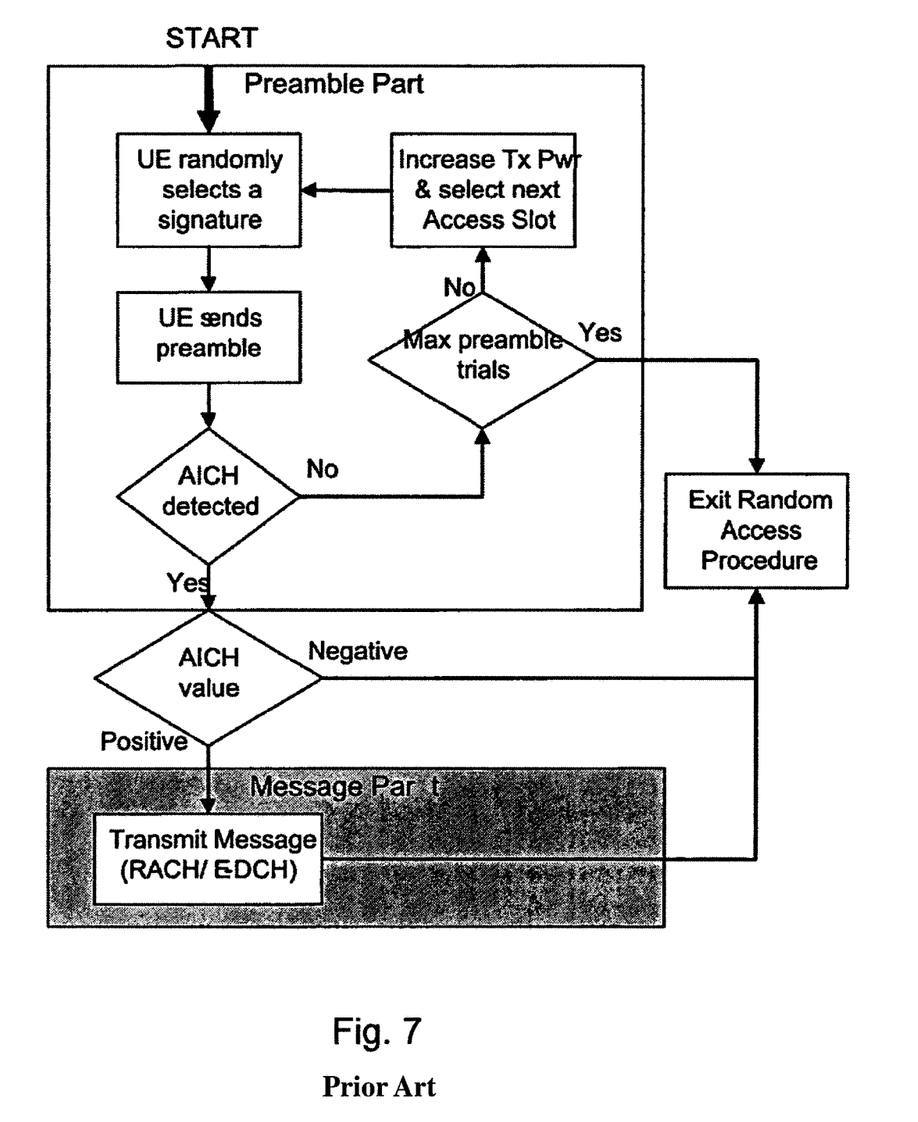
FIG. 7 shows an uplink random access procedure.

If the mobile terminal fails to receive the AICH it will retry sending the preamble at a higher power level since the likely cause of the failure is due to the base station not having received the preamble. The mobile terminal will keep trying up to a maximum number of attempts to get an AICH from the base station. If it fails after the maximum number of attempts it will back off a random time before retrying. This RACH procedure is summarized by the flow chart of FIG. 7.

Figure 8A:
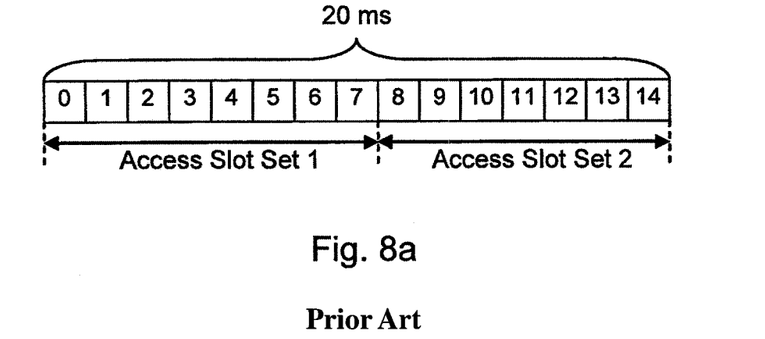
FIG. 8a illustrates available random access slots arranged in two access slot groups.

The mobile terminal may transmit the RACH preamble in access slots which are allocated or assigned to it. Such access slots will also be referred to as assigned access slots in the sequel. There are 15 access slots within two radio frames (2×10 ms), which are in principle available for random access. Such access slots will also be referred to as available access slots in the sequel. The 15 available access slots are divided into two 10 ms access slot sets or access slot groups, as shown in FIG. 8*a*. Here, the available access slots of a first group or Access Slot Set 1 (AS1) are numbered from 0 to 7, and the available access slots of a second group or Access Slot Set 2 (AS2) are numbered from 8 to 14.

The available access slots that a mobile terminal may actually use are assigned to the mobile terminal by the network. For example, in FIG. 8*b*, a mobile terminal is allowed to transmit its preamble in the assigned access slots {1, 4, 7, 10, 13}, wherein the assigned access slots {1, 4, 7} belong to access slot set 1 and the assigned access slots {10, 13} belong to access slot set 2. When a mobile terminal wishes to transmit a RACH preamble at a given time instant, it will conventionally wait for the next access slot set following in time and then randomly select a valid (i.e. assigned) access slot in said access slot set. Suppose the mobile terminal wishes to transmit a preamble (e.g. it suddenly got a packet to transmit) at the time corresponding to the available access slot 2 in AS1. The mobile terminal will hence randomly select an assigned access slot from the next access slot set, which is AS2. That is to say, it can (randomly) select either assigned access slot 10 or 13. Although access slots 4 and 7 of AS1 are also assigned to the mobile terminal, the mobile terminal cannot use them since they belong to the current access slot set (AS1), which has already begun. This causes unnecessary delay to the mobile terminal's initial access. Hence, it is desirable to reduce this delay.

Figure 8B:
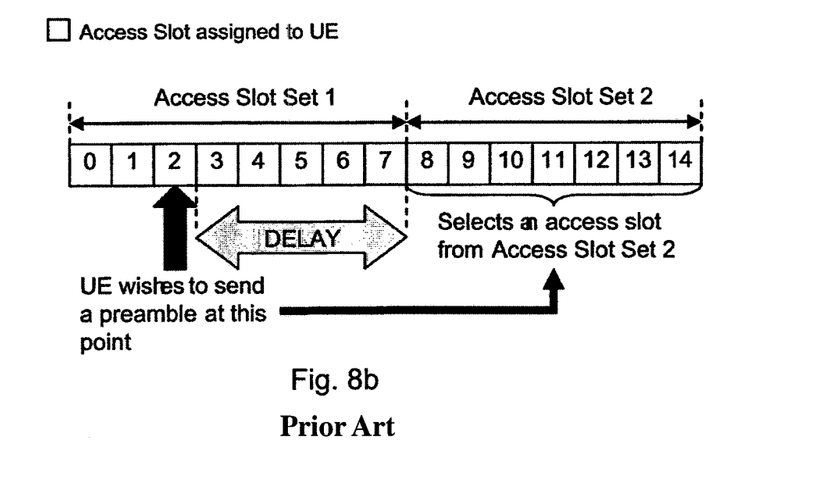
FIG. 8b illustrates a delay in an access slot selection according to the prior art.

A solution has been proposed wherein the mobile terminal is allowed to use remaining assigned access slots in the currently valid frame or access slot set rather than to wait for the next frame or access slot set. In the example of FIG. 8*b*, the mobile terminal may, hence, randomly select a remaining assigned access slot of AS1. That is to say, it may select either access slot 4 or acess slot 7, instead of having to wait for the next access slot set (AS2).

The problem with this solution is, however, that the mobile terminal will always have a smaller number of assigned access slots from which to choose in a current access slot set, since it is likely that the mobile terminal is in the middle of an access slot set when it wishes to transmit its RACH preamble. The rationale in selecting a random access slot within a whole access slot set is that the mobile terminals in a cell will be less likely to transmit their RACH preambles at the same time causing clashes leading to a failed attempt. The aforementioned solution will cause the mobile terminal to bias towards selecting assigned access slots that are towards the end of the current access slot set. In the example of FIG. 8*b*, mobile terminals will be more likely to select access slot 4 or 7 than access slot 1. When all mobile terminals perform the same procedure, the probablity of preamble clashes (especially towards the end of the access slot set) and, hence, failed attempts increases.

Hence, it is desirable to reduce random access delays and, at the same time, to also reduce the probablity of preamble clashes or collisions.

SUMMARY

Embodiments of the present invention may be based on the finding that the mobile terminal may not only be allowed to use the remaining assigned access slots in a currently valid access slot set but also, i.e. in addition, assigned access slots of the upcoming, i.e. next, access slot set. In this way the mobile terminal may always have a similar number of assigned access slots from which to choose as comprised by the current access slot set. Embodiments may, hence, avoid the aforementioned disadvantageous bias towards selecting assigned access slots that are towards the end of the current access slot set and to also reduce the probablity of preamble collisions.

Although embodiments will be described with particular focus on random access slots, i.e., access time intervals, embodiments are not limited to random access slots as sole random access radio resources. As the skilled person will appreciate, embodiments of the present invention may as well be transferred to other appropriate random access radio resources, like, e.g., radio frequencies, spreading codes, etc.

Embodiments provide an apparatus for performing a random access procedure from a mobile terminal to communicate with a cell of a wireless communication network, the random access procedure providing a first and a second group of random access radio resources available for the cell, wherein the first and the second group comprise a plurality of random access radio resources assigned to the mobile terminal for sending a random access preamble to the cell of the wireless communication network. The apparatus comprises means for providing, to the mobile terminal, a sliding resource window comprising a plurality of consecutive available random access radio resources from at least one of the two groups, wherein the mobile terminal may randomly select, from the resource window, one of the available random access radio resources assigned to the mobile terminal for sending the random access preamble, and wherein a start of the sliding resource window depends on an available random access radio resource, which is currently valid for random access to the cell of the wireless communication network.

Embodiments hence allow forming a window of available random access radio resources, within which the mobile terminal (UE) can randomly select an assigned random access radio resource. The resource window is flexible in the sense that it can start from any of the available random access radio resources after the mobile terminal decides to transmit a random access preamble. In embodiments the resource window comprises available random access radio resources from more than one group of available random access radio resources. That is to say, the resource window may comprise a plurality of consecutive available random access radio resources from both of the two groups.

In some embodiments the sliding resource window may comprise less consecutive available random access radio resources than comprised or contained by the two groups. In particular, the total number of random access radio resources contained in the flexible window may be substantially similar to the number of random access radio resources contained in a single complete group of random access radio resources available for the cell. According to one embodiment, the total number of random access radio resources contained in the flexible resource window may be equal to or larger than $\lceil(N_1+N_2)/2\rceil$, wherein $\lceil.\rceil$ denotes the rounding up operation to the next integer, $N_1$ denotes the number of available random access radio resources contained in the first group, and $N_2$ denotes the number of available random access radio resources contained in the second group of available random access radio resources. Thereby, $N_1$ and $N_2$ may be different from each other. In one embodiment $N_1$ may be equal to 8, wherein $N_2$ may be equal to 7, for example. In this case the total number of random access radio resources available for the cell is $N_1+N_2=15$, leading to a resource window size $\lceil(N_1+N_2)/2\rceil=8$. In such a case the total number of random access radio resources comprised by the sliding resource window hence corresponds to a number of random access radio resources comprised by the larger one of the both random access resource groups.

The sliding resource window may preferably extend from the first group into the second group of consecutively arranged available random access radio resources. This may be guaranteed if the total number of random access radio resources contained in the flexible window is chosen larger than $\lceil(N_1+N_2)/2\rceil$. In case the total number of random access radio resources contained in the flexible window is chosen equal to $\lceil(N_1+N_2)/2\rceil$, the extension of the window over the two groups may be ensured if at least the first resource (e.g. in the time or frequency domain) of the consecutively arranged available random access radio resources of the first group is excluded from the window. Here, the "first" resource is to be understood as the random access radio resource marking the start of the first group. That is to say, the resource window may start with the second, or third, or fourth (etc., up to the last) random access radio resource of the first group.

Whereas some embodiments may be direct towards the assignment of a fixedly sized random access resource window, for example for an uncomplicated implementation, other embodiments may be related to a flexibly sizeable resource window. For example, the window size may change depending on a time at which a trigger occurs for the mobile terminal to transmit a random access preamble. In other words, a total number of random access radio resources comprised by the sliding resource window may be assigned flexibly or variably, wherein the means for assigning is configured to adapt the total number of available random access resources comprised by the sliding resource window depending on a trigger time at which the trigger for sending the random access preamble occurs, such that the total number of available random access resources comprised by the sliding resource window corresponds to the total number of available random access resources comprised by the group of available random access radio resources which is currently effective at the trigger time. Given the example above, this would mean that the total number of random access radio resources comprised by the sliding resource window may correspond to $N_1=8$, if the first group of available random access radio resources is currently effective at the trigger time, while the total number of random access radio resources comprised by the sliding resource window may correspond to $N_2=7$, if the second group of available random access radio resources is currently effective at the trigger time. This may allow the mobile terminal to maintain the same number of random access radio resources as it can select from in the prior art.

According to some embodiments the means for assigning may also be configured to assign different sliding resource windows comprising a different numbers of random access radio resources, respectively, to different mobile terminals. In this way different classes of mobile terminals, which may get assigned different numbers of random access resources by the wireless communication system, may be taken into account.

In a further embodiment the sliding resource window may also span non-contiguous (i.e. not directly adjacent but intermittent) available random access radio resources of the two groups. This may be useful, for example, if the two groups of random access radio resources (e.g. time slots, carrier frequencies, spreading codes, etc.) available for the cell are not contiguous. That is, one part of the resource window may span contiguous available random access radio resources of the first group, a second part of the resource window may span contiguous available random access radio resources of the second group, and an intermediate part between the first and second part of the resource window may span arbitrary other (intermediate) radio resources lying in between the first and second group of random access radio resources.

As mentioned before, the random access radio resources may e.g. be random access time slots, which may be used for uplink random access in the wireless communication network. The wireless communication network may e.g. be a UMTS or WCDMA network, according to some embodiments. Of course, also other wireless communication networks, such as GSM/EDGE, CDMA2000, LTE, etc., are possible. In particular for UMTS, the total number of available random access time slots covered by the two groups may be 15. Further, the total number of available random access time slots may be separated into two successive random access slot sets (groups), AS1 and AS2.

The apparatus for performing the random access procedure from the mobile terminal to communicate with the cell of the wireless communication network may be implemented by hardware (e.g. electrical circuitry) in one or various network components. According to one embodiment, the apparatus and/or its means for providing the sliding resource window to the mobile terminal may be implemented by means of a base station entity, or Radio Network Controller (RNC), or a combination thereof. In this case the network may assign the sliding resource window to the mobile terminal e.g. by means of downlink control signaling. In other embodiments, the apparatus and/or its means for providing the sliding resource window to the mobile terminal may be implemented within the mobile terminal itself. The mobile terminal may comprise a digital signal processor which, for example, computes and provides the sliding resource window for uplink random access to the wireless network, when the mobile terminal is in Cell_FACH state.

Yet further embodiments also provide a method for performing a random access procedure from a mobile terminal to communicate with a cell of a wireless communication network, the random access procedure providing a first and a second group of random access radio resources available for the cell, wherein the first and the second group comprise a plurality of random access radio resources assigned to the mobile terminal for sending a random access preamble to the cell of the wireless communication network.

The method comprises a step of providing, to the mobile terminal, a sliding random access resource window comprising a plurality of consecutive available random access radio resources from at least one of two groups, wherein the mobile terminal may randomly select, from the resource window, one of the available random access radio resources assigned to the mobile terminal for sending the random access preamble, and wherein a start of the sliding resource window depends on an available random access radio resource, which is currently valid for random access to the cell of the wireless communication network.

Some embodiments comprise a digital control circuit installed within the apparatus for performing the method for performing a random access procedure. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

Embodiments of the present invention, in particular related to random access slots as the radio resources, may allow a mobile terminal to select an assigned random access slot immediately and at the same time avoid biasing the random access slot selection towards the end of a currently active Access Slot Set. Further, embodiments may reduce the initial random access time. This is important for a mobile terminal in Cell_FACH state that may need to access the uplink resource (RACH or E-DCH) numerous times.

BRIEF DESCRIPTION OF THE FIGURES

Some embodiments of apparatuses and/or methods will be described in the following by way of example only, and with reference to the accompanying figures, in which FIG. 1 schematically shows block diagrams of apparatuses for performing a random access procedure from a mobile terminal, according to different embodiments of the present invention.

DESCRIPTION OF EMBODIMENTS

Various example embodiments will now be described more fully with reference to the accompanying drawings in which some example embodiments are illustrated. In the drawings, the thicknesses of layers and/or regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
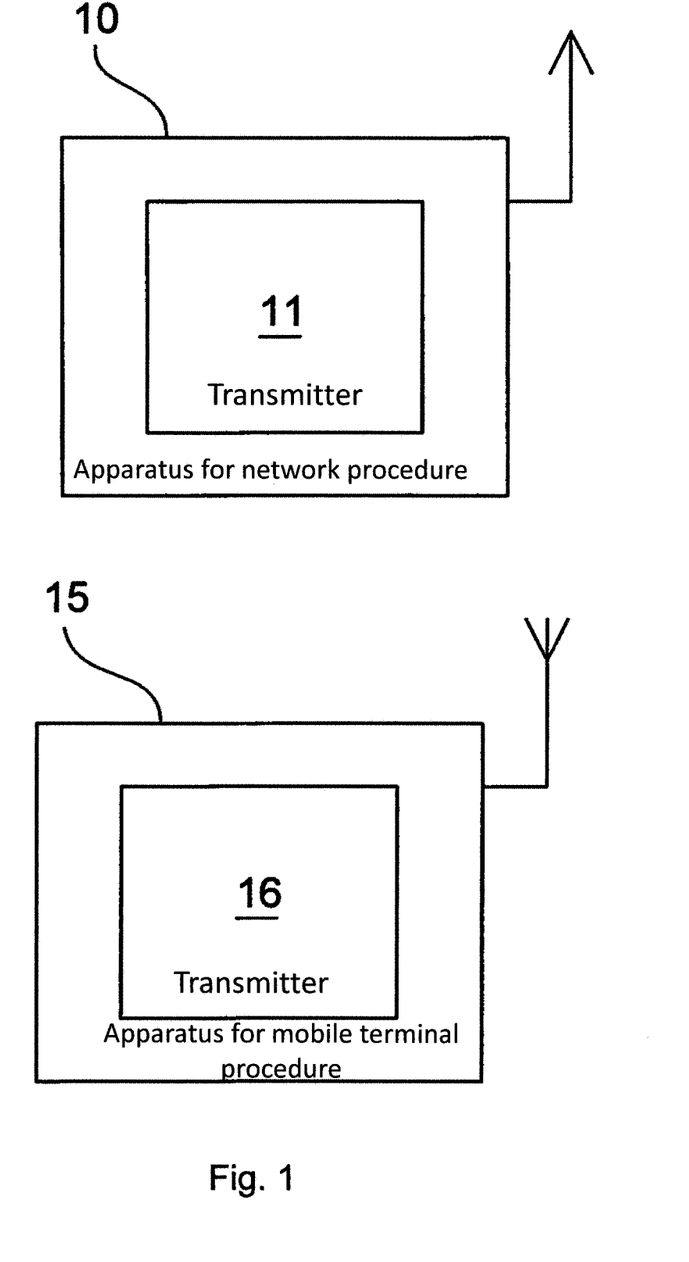

FIG. 1 schematically shows two block diagrams of different apparatuses 10, 15 for performing an uplink random access procedure, according to a first and a second embodiment of the present invention.

For the uplink random access procedure a first and a second group of random access radio resources for a serving radio cell are made available, wherein the first and the second group (not shown in FIG. 1) each comprise a plurality of available random access radio resources assigned to a mobile terminal for sending a random access preamble to the serving cell or its serving base station (NodeB) of a wireless communication network, which may, e.g., be a WCDMA-type network (e.g. UMTS). Each apparatus 10 or 15 comprises means 11 or 16 for providing, to the mobile terminal, a sliding random access resource window comprising a plurality of consecutive available random access radio resources from at least one of the two groups, wherein the mobile terminal may randomly select, from the resource window, one of the available random access radio resources assigned to mobile terminal for sending the random access preamble, and wherein a start of the sliding resource window depends on an available random access radio resource, which is currently valid for uplink random access to the serving cell when a trigger for the random access preamble occurs.

Figure 2:
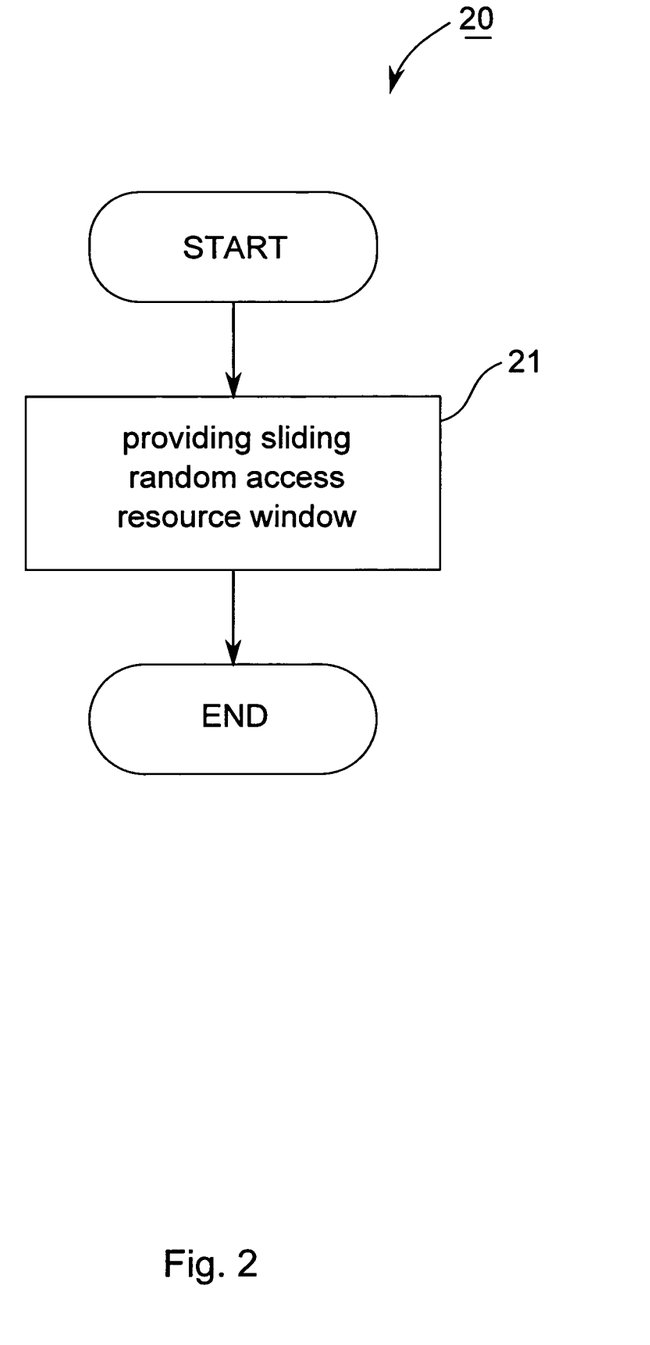
FIG. 2 schematically shows a flow a chart of a method for performing a random access procedure, according to different embodiments of the present invention.

The difference between the two schematically depicted apparatuses 10 and 15 is, that apparatus 10 may be implemented on network side (e.g. base station and/or RNC), whereas apparatus 15 may be implemented in the mobile terminal itself. Depending on whether the network provides or assigns the sliding resource window to the mobile terminal e.g. with the help of corresponding downlink signaling, or whether the mobile terminal computes or determines the sliding resource window for its uplink random access procedure on its own, a step 21 of providing the sliding resource window to the mobile terminal may differ in various embodiments of the method 20 for performing an uplink random access procedure from a mobile terminal (see FIG. 2).

Figure 3A:
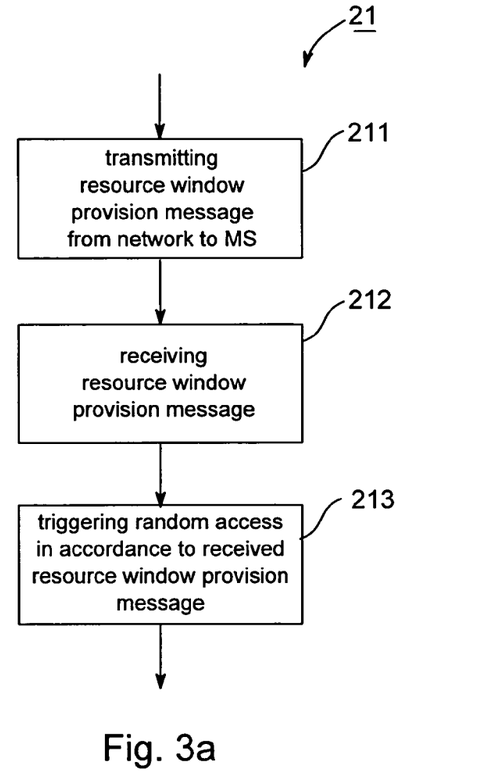
FIG. 3A schematically shows flow charts of sub-steps of a resource window where implementation occurs on the wireless network side.

As may be seen from FIG. 3a, which illustrates various sub-steps of method-step 21 for the case where apparatus 10 is implemented on wireless network side, the step 21 of providing the sliding resource window may comprise a first sub-step 211 of sending or transmitting a resource window provision or assignment message from the wireless communication network to the associated or registered mobile terminal, wherein the resource window provision message may, e.g., comprise information indicative of the size of the sliding resource window. Further, the step 21 may comprise a second sub-step 212 of receiving the resource window provision message at the mobile station. The receiving sub-step 212 may further include a step of acknowledging the correct receipt of the resource window provision message towards the wireless communication network. Also, the step 21 of providing the sliding resource window may comprise a sub-step 213 of actually triggering uplink random access circuitry of the mobile terminal to perform uplink random access in accordance to the provided or assigned flexible sliding resource window. Thereby, depending on the embodiment, the mobile station may e.g. be in Cell_FACH state wishing to transmit a RACH preamble to its serving base station.

Figure 3B:
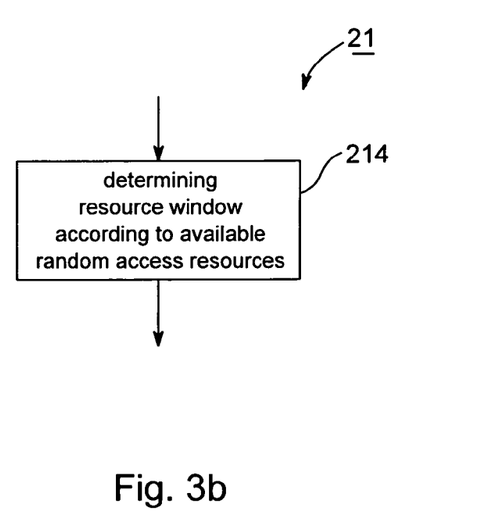
FIG. 3B schematically shows flow charts of sub-steps of a resource window where implementation occurs on the mobile terminal side.

According to other embodiments of the method 20 and, hence, the step 21 of providing, the sliding resource window may be determined on mobile terminal side. In this case the step 21 may comprise a sub-step 214 of determining the sliding resource window, at the mobile terminal, in response to available random access resources formerly having been assigned to the mobile terminal by the network for a uplink random access procedure (see FIG. 3b). Here, the window may be computed depending on a currently valid (at the preamble trigger time) random access resource and/or a number of assigned random access resources and/or their positions within the two groups. In such an embodiment the mobile terminal may handle the determination of the resource window without the assistance of wireless network components, such as base stations, RNCs, or combinations thereof.

After the generic concept of arbitrary random access radio resources has been discussed in the foregoing, specific exemplary embodiments related to random access (time) slots as the random access radio resources will be highlighted in the following.

A basic idea of such embodiments is to form a window of available access slots where the mobile terminal can randomly select an assigned access slot within this window of available access slots, where the window is flexible in the sense that it can start from any of the available access slots after the mobile terminal decides to transmit a RACH preamble, and wherein the window comprises available access slots from more than one access slot set.

Figure 4:
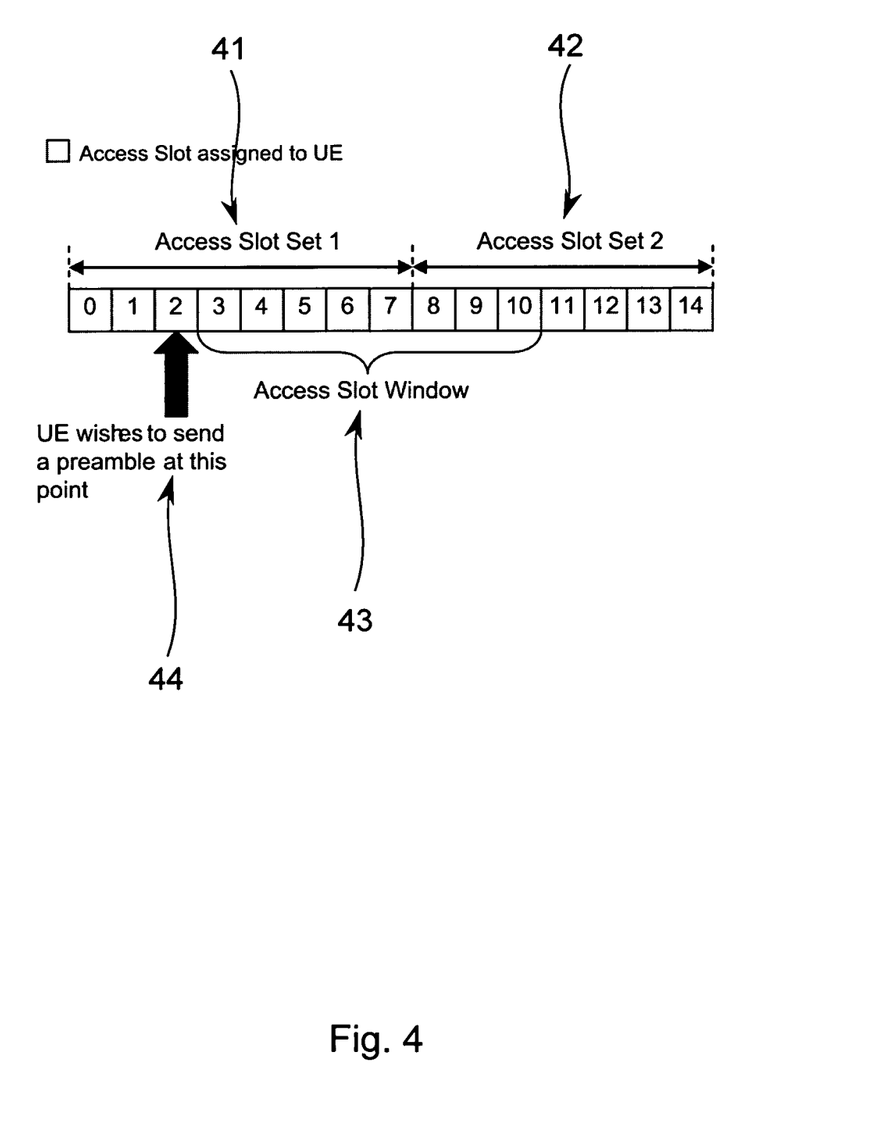
FIG. 4 shows a flexible access slot window, according to an embodiment.

FIG. 4 shows an example of a flexible (sliding) access slot window.

The UMTS random access procedure provides a first group 41 and a second group 42 of random access slots being principally available for random access to a radio cell. The first group 41 comprises a plurality of first available random access slots 0 to 7. The second group 42 comprises a plurality of second available random access slots 8 to 14, such that the first and the second group together comprise a plurality of 15 available random access slots, which are principally available for random access to the wireless communication network. However, not all of the 15 available random access slots are also assigned to the mobile terminal to be used by said mobile terminal for its random access procedure. Instead, only a subset of the 15 available random access slots are actually assigned or allocated the mobile terminal for its use. In the example of FIG. 4 the assigned subset comprises the available random access slots {1; 4; 7; 10; 13}. Other mobile terminals may be assigned other subsets of the available random access slots 0 to 14 of the first and the second access slot sets 41 and 42.

Regarding the example of FIG. 4, when the mobile terminal (UE) is in available random access slot 2, it wishes to transmit a RACH preamble (see reference numeral 44). According to an embodiment, the mobile terminal forms an access slot window 43 spanning parts of access slot set 41 (AS1) and access slot set 42 (AS2), wherein the resource window 43 covers the available access slots 3 to 10. In this embodiment the total number of available random access slots spanned by the flexible resource window 43 is substantially similar to the number of available random access slots contained in a single complete access slot set 41 or 42. The mobile terminal may select any of the access slots that are assigned to it in this resource window 43, namely assigned access slots 4, 7 and 10 in the example depicted in FIG. 4. Thus, the assigned access slot selection is no longer biased towards the end of an access slot set and therefore the probability of collisions between different mobile terminals wishing to enter the RACH procedure is not increased. Further, the delay in selecting an assigned access slot is still reduced.

In one embodiment, the size of the resource window 43 may change depending on a time at which the trigger 44 occurs for the mobile terminal to transmit a RACH preamble. For example, if the mobile terminal currently is in access slot set 41 (AS1) the resource window size may correspond to eight available access slots. In case the mobile terminal currently is in access slot set 42 (AS2), the window size may correspond to seven available access slots. This may allow the mobile terminal to maintain the same number of assigned access slots (here: three) as it can select from in the prior art. Note that according to the prior art, different access slot sets may contain different numbers of available and/or assigned access slots, so the mobile terminal would have a different number of assigned access slots to select from depending on the access slot set that it draws its assigned access slots from.

According to further embodiments different mobile terminals (or terminal classes) may also be given or assigned different random access resource window sizes. Of course this does not preclude the use of a fixed window size (e.g. 20 ms) for an uncomplicated implementation.

In yet a further embodiment, the resource window 43 may also span non-contiguously arranged access slots which are principally available for uplink random access to the network. This may be useful, for example, if the two access slot sets 41, 42 are not contiguous, which is exemplarily shown in FIG. 5.

Figure 5:
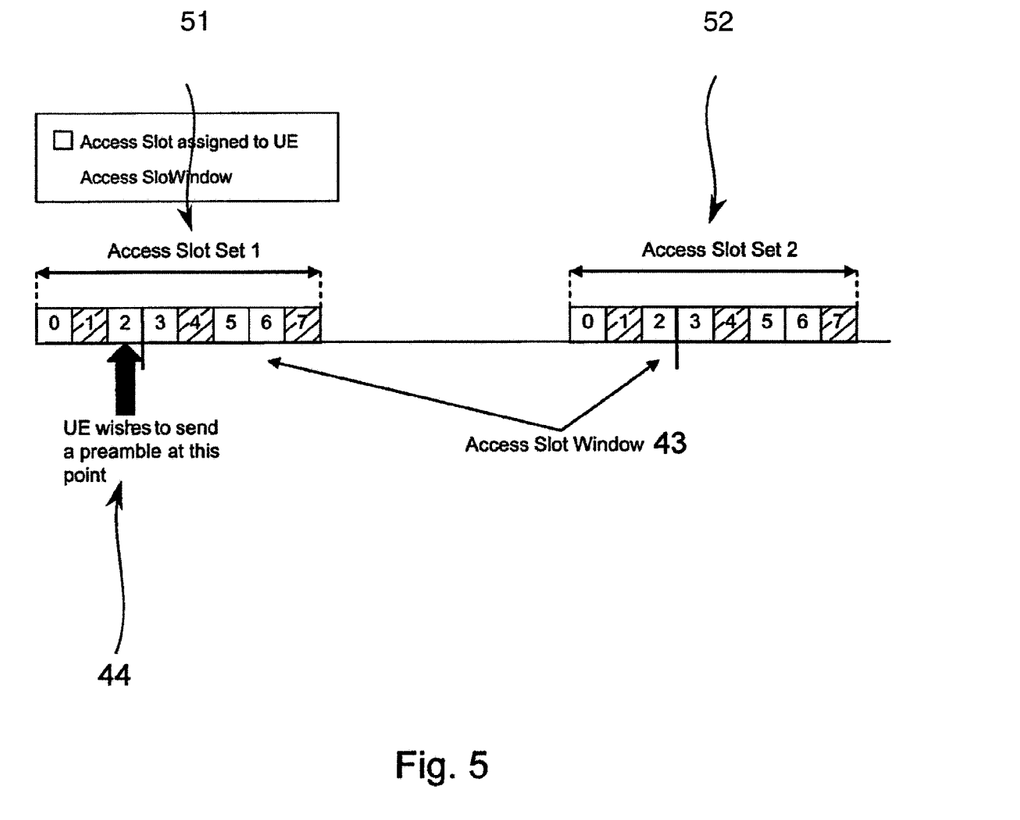
FIG. 5 shows an access slot window spanning non-contiguous access slot sets, according to an embodiment.

The resource window 43 may comprise consecutive but intermittently arranged access slots. Thereby the available access slots may be arranged in a first part 51 comprising consecutive or even adjacent available access slots of the first access slot set 41 (AS1) and in a second part 52 comprising consecutive or even adjacent available access slots of the second access slot set 42 (AS2), wherein the two parts 51, 52 are arranged interruptedly from each other. A resource window of fixed length in time would, in this example, not contain more available random access slots than the remnant of the current access slot set 41. However, by allowing the window 43 to span multiple non-contiguous access slot sets 41, 42, the length of the random access resource window 43 in terms of available access slots can be kept constant despite the fact that the access slot sets 41, 42 are non-contiguous.

Figure 6:
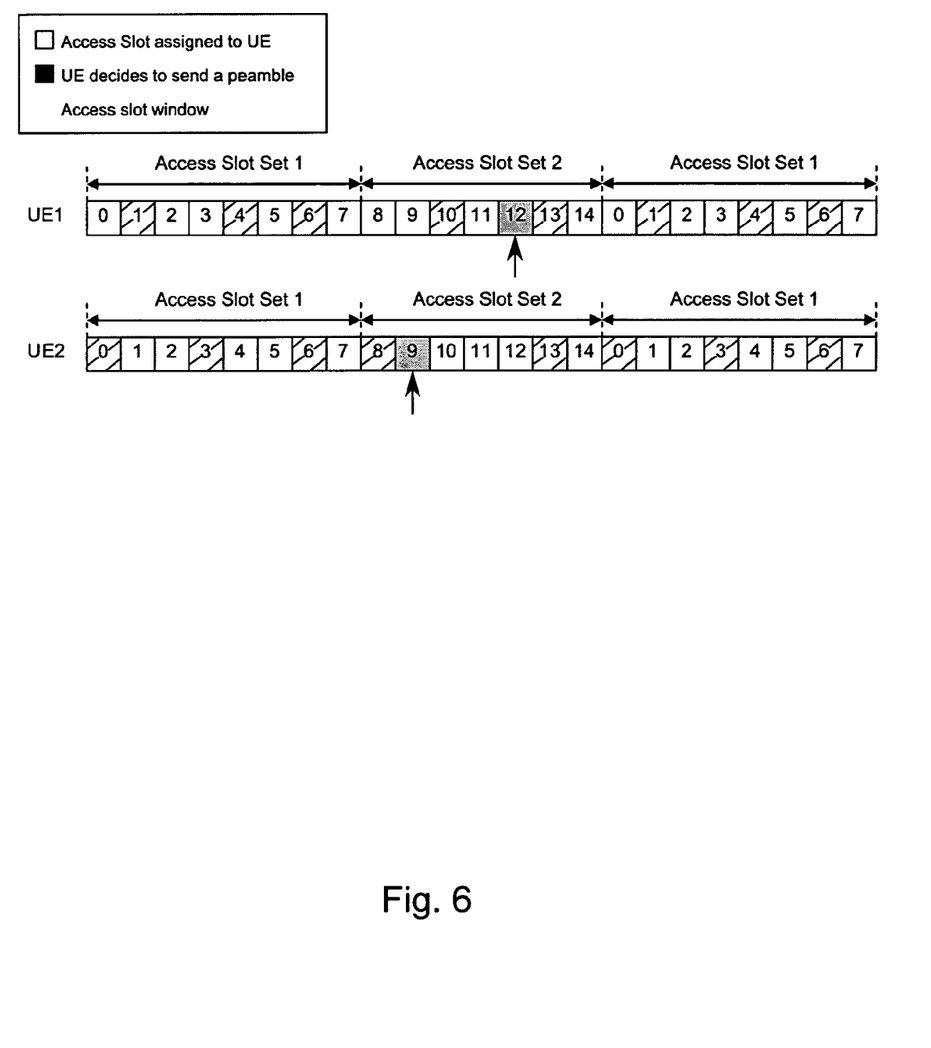
FIG. 6 shows two different access slot sets assigned to two different mobile terminals.

FIG. 6 shows two mobile terminals, UE1 and UE2, having differently assigned access slots within available access slot sets AS1 and AS2. The subset of available access slots assigned to UE1 is {1; 4; 6; 10; 12; 13}, while the subset of available access slots assigned to UE2 is {0; 3; 6; 8; 9; 13}.

The mobile terminal UE1 decides to transmit a RACH preamble at a trigger time instant corresponding to available access slot 12. It then forms or determines an access slot window spanning eight access slots starting from the next available access slot 13 with respect to the trigger time instant. The determined access slot window spans the two available access slot sets AS1, AS2, and comprises the assigned access slots {1, 4, 13}, which UE1 may use for its random access procedure. From this set of assigned access slots {1, 4, 13} comprised by the window UE1 randomly selects assigned access slot 1 to transmit its RACH preamble.

The mobile terminal UE2 decides to transmit a RACH preamble at a trigger time instant corresponding to available access slot 9. It then forms or determines an access slot window spanning eight access slots starting from the next available access slot from the trigger time instant, i.e. available access slot 10. The determined access slot window spans the two available access slot sets AS1, AS2, starting from the available access slot 10, and comprises the assigned access slots {0, 13}, which UE2 may use for its random access procedure. From this set of assigned access slots {0, 13} comprised by the access slot window UE2 randomly selects assigned access slot 13 to transmit its RACH preamble.

In contrast, the aforementioned solution where the mobile terminal only randomly selects the remaining assigned access slot in the currently active or effective access slot set would cause UE1 and UE2 both to select access slot 13 to transmit their preambles, hence, resulting in a RACH preamble clash.

Embodiments of the aforementioned apparatuses may comprise a signal processor, respectively, executing a computer program having a program code for performing or supporting embodiments of the above described method when the computer program is executed on said processor. Hence, embodiments may provide a computer program having a program code for performing one of the above described methods when the computer program is executed on a computer or processor. A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

To summarize, embodiments of the present invention may enable a mobile terminal to select a random access slot immediately and, at the same time, to avoid biasing the random access slot selection towards the end of a currently active access slot set. Further, embodiments may reduce the initial random access time. This is important for a mobile terminal in CELL_FACH state which may need to access an uplink resource (RACH or E-DCH) numerous times.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus for performing a random access procedure from a mobile terminal to communicate with a cell of wireless communication network, the random access procedure providing a first and a second group of random access radio resources available for the cell, wherein the first and the second group comprise a plurality of random access radio resources assigned to the mobile terminal for sending a random access preamble to the cell of the wireless communication network, the apparatus comprising:

a transmitter configured to use a processor for providing to the mobile terminal, a sliding resource window comprising a plurality of consecutive available random access radio resources from at least one of the two groups, wherein the mobile terminal may randomly select, from the resource window, one of the available random access radio resources assigned to the mobile terminal for sending the random access preamble, and wherein a start of the sliding resource window depends on an available random access radio resource, which is currently valid for uplink random access to the cell of the wireless communication network.

2. The apparatus according to claim 1, wherein the sliding resource window comprises less consecutive available random access radio resources than the two groups.

3. The apparatus according to claim 1, wherein the sliding resource window extends from the first group into the second group of consecutively arranged available random access radio resources, thereby excluding at least the first of the consecutively arranged available random access radio resources of the first group.

4. The apparatus according to claim 1, wherein a total number of random access radio resources comprised by the sliding resource window corresponds to a number of random access radio resources comprised by the larger one of the two groups.

5. The apparatus according to claim 1, wherein a total number of random access radio resources comprised by the sliding resource window is flexible, wherein the transmitter is further configured to adapt a total number of random access radio resources comprised by the sliding resource window depending on a trigger time at which a trigger for sending the random access preamble occurs, such that the total number of random access radio resources comprised by the sliding resource window corresponds to the total number of random access radio resources comprised by the group of available random access radio resources which is currently effective at the trigger time.

6. The apparatus according to claim 1, wherein the transmitter is further configured to provide sliding resource windows comprising a different number of available random access radio resources to different mobile terminals.

7. The apparatus according to claim 1, wherein the sliding resource window spans non-contiguous available random access radio resources.

8. The apparatus according to claim 1, wherein the random access radio resources are random access time slots.

9. The apparatus according to claim 8, wherein a total number of available random access time slots is separated into two successive random access slot groups.

10. The apparatus according to claim 8, wherein the total number of available random access time slots is 15.

11. The apparatus according to claim 1, wherein the apparatus is implemented in a network component of the wireless communication network.

12. The apparatus according to claim 1, wherein the apparatus is implemented in the mobile terminal.

13. The apparatus according to claim 1, wherein the wireless communication network is a WCDMA or LTE network.

14. A method for performing a random access procedure from a mobile terminal to communicate with a wireless communication network, the random access procedure providing a first and a second group of available random access radio resources, wherein the first and the second group comprise a plurality of random access radio resources assigned to the mobile terminal for sending a random access preamble to the wireless communication network, the method comprising:

transmitting, to the mobile terminal, a sliding resource window comprising a plurality of consecutive available random access radio resources from at least one of the two groups, wherein the mobile terminal may randomly select, from the resource window, one of the available random access radio resources assigned to the mobile terminal for sending the random access preamble, and wherein a start of the sliding resource window depends on an available random access radio resource, which is currently valid for uplink random access to the cell of the wireless communication network.

15. A non-transitory computer readable medium having stored thereon a computer program having a program code that, when executed by a computer or processor, causes the computer or processor to execute the method according to claim 14.

* * * * *